(12) United States Patent
Chudy et al.

(10) Patent No.: US 9,163,716 B2
(45) Date of Patent: Oct. 20, 2015

(54) GEAR CASING HEAT EXCHANGER

(71) Applicant: Modine Manufacturing Company, Racine, WI (US)

(72) Inventors: Christopher Chudy, Greenfield, WI (US); Daniel Raduenz, Franklin, WI (US); Ashutosh Patil, Racine, WI (US); Frances Kis, Burlington, WI (US); Timothy Carlson, Racine, WI (US); Siddharth Jain, Lindenhurst, IL (US)

(73) Assignee: Modine Manufacturing Company, Racine, WI (US)

( * ) Notice: Subject to any disclaimer, the term of this patent is extended or adjusted under 35 U.S.C. 154(b) by 0 days.

(21) Appl. No.: 13/839,139

(22) Filed: Mar. 15, 2013

(65) Prior Publication Data

US 2014/0157952 A1 Jun. 12, 2014

Related U.S. Application Data

(60) Provisional application No. 61/736,335, filed on Dec. 12, 2012.

(51) Int. Cl.
F16H 57/04 (2010.01)
(52) U.S. Cl.
CPC ........ *F16H 57/0417* (2013.01); *F16H 57/0483* (2013.01); *Y10T 74/2189* (2015.01)

(58) Field of Classification Search
USPC ....... 74/606 A; 184/6, 6.12; 123/41.31, 41.33
See application file for complete search history.

(56) References Cited

U.S. PATENT DOCUMENTS

| | | | | |
|---|---|---|---|---|
| 2,687,784 A | * | 8/1954 | Klackner | 184/104.1 |
| 4,633,938 A | * | 1/1987 | Schunck et al. | 165/47 |
| 5,678,461 A | * | 10/1997 | Stine | 74/606 A |
| 6,036,236 A | * | 3/2000 | Bensel | 285/89 |

FOREIGN PATENT DOCUMENTS

| | | |
|---|---|---|
| JP | 2003-240107 A | 8/2003 |
| JP | 2004-286160 A | 10/2004 |
| JP | 2007-064318 A | 3/2007 |

\* cited by examiner

*Primary Examiner* — Vicky Johnson
(74) *Attorney, Agent, or Firm* — Michael Best & Friedrich LLP

(57) ABSTRACT

A gear casing heat exchanger has a mounting flange separating the heat exchanger into a first side and a second side. A manifold section is on the first side, and includes an inlet manifold and an outlet manifold. A heat exchange section is on the second side, and extends from the mounting flange in a lengthwise direction. A sealing perimeter is on the second side, and the heat exchange section is entirely contained within a projection of the sealing perimeter in the lengthwise direction. The heat exchange section of the heat exchanger can be inserted through an aperture of a gear casing to provide a cooled gear assembly.

19 Claims, 4 Drawing Sheets

GEAR CASING HEAT EXCHANGER

BACKGROUND

Gears are commonly used to effect the transfer of power from one rotating element to another. Typically, the teeth of a first gear coupled to a first rotating shaft engage with the teeth of a second gear coupled to a second rotating shaft. The axes of the first and second rotating shafts can be parallel, perpendicular, or at some other angle, depending on the particular needs of the power transfer apparatus. Multiple such gears are often combined to accomplish a desired power transfer between an input shaft and one or more output shafts. This power transfer can effect a desirable transformation of the rotational velocity and torque, as well as a change in the orientation of the axis about which the rotation occurs.

Gears are typically contained within a housing or gear casing. The gear casing provides support for the shafts of the gears, ensuring the engagement of the gear teeth, and prevents debris from fouling the teeth, among other functions. Examples of such gear casings can be found in differentials and power transfer units, among others.

Differentials are typically used in automobiles, trucks, and other wheeled vehicles that utilize paired drive wheels in order to propel the vehicle. The differential operates by transmitting, through a series of engaging gears, a torque from the drive shaft of the vehicle to a pair of axially aligned but independently rotating axles, each of which connects to a driving wheel of the vehicle. Due to the independent rotation of each of the pair of axles, the driving wheels attached thereto can be rotated at non-equal speeds. Such operation is beneficial during, for example, the negotiation of a curve by the vehicle, when the driving wheel located radially outward of the curve must rotate at a faster rotational speed than the driving wheel located radially inward of the curve in order to prevent either dragging of the outer wheel or slipping of the inner wheel.

Power transfer units (PTUs) are used in automobiles, trucks, and other wheeled vehicles in which multiple spaced apart wheeled axes of the vehicle are simultaneously driven by the engine and transmission. As one example, automobiles featuring "all-wheel drive" typically have a front axle driven directly by the drive shaft of the vehicle, and a rear axle driven by a power transfer unit. The power transfer unit operates by transmitting, through a series of engaging gears, a torque from a first shaft located at the front of the vehicle and extending in the width direction of the vehicle, to a second shaft extending perpendicular to the first shaft towards the rear axle of the vehicle, in order to drive the rear axle.

High-viscosity oil is typically contained within the casing of the differential or PTU to adequately lubricate the engaging gears therein. The rotation of the gears churns the oil, thereby ensuring that the meshed gear surfaces are continuously lubricated. Consequently, a pump or other means to move the oil through the casing is typically not required.

Under certain operating conditions, the oil used to lubricate the gears can become heated to temperatures in excess of the recommended operating temperature of the oil. Such operating conditions can include (but are not limited to) high-load operation of the vehicle, high ambient temperatures, restricted airflow over the gear casing, and combinations of the above.

In order to address this problem of overheating the oil, heat exchangers to transfer heat from the oil to an engine coolant loop have been known to be incorporated into the gear casing. An example of such a heat exchanger, shown in Japanese utility model 1991-079052, consists of a flat cooler integrated into the inner chamber of a differential during manufacture. Such a heat exchanger can add considerable cost to the vehicle, and is not needed for all intended uses of the vehicle. It is often not known, at the time that the vehicle is manufactured, whether or not the eventual vehicle owner will operate the vehicle in any of the operating conditions that require cooling of the oil. Furthermore, the addition of such a cooler to the gear casing after the vehicle has already been assembled is very problematic, requiring substantial disassembly of the drivetrain. Thus, there is still room for improvement.

SUMMARY

According to some embodiments of the invention, a cooled gear assembly includes a casing containing engaged gears. An aperture extends through an outer wall of the casing, and a heat exchanger partially extends into an interior volume of the casing through the aperture. The heat exchanger includes a heat exchange section located within the interior of the casing and a manifold section located exterior to the casing. The heat exchange section has multiple fluid conduits. The manifold section includes an inlet manifold and an outlet manifold. A header of the heat exchanger fluidly seals the aperture, and inlet and outlet ends of the fluid conduits are fluidly connected to the inlet and outlet manifolds through the header.

In some embodiments, each of the fluid conduits includes a first and a second straight tube length, and a return bend joining them. The first straight tube length extends from the header, and an end of the first tube length is joined to the header. The second straight tube length is parallel to the first. The return bend joins the ends furthest from the header. In some embodiments an end of the second tube length is joined to the header.

In some embodiments the aperture in the casing is circular. In some embodiments the heat exchanger includes an o-ring within a circumferential groove at the outer periphery of the header.

In some embodiments the heat exchanger is assembled into the gear assembly by inserting the heat exchange section into the interior of the casing through the aperture. In some embodiments the heat exchanger is secured to the casing using a mounting flange of the heat exchanger located exterior to the casing between the heat exchange section and the manifold section.

According to some embodiment of the invention, a gear casing heat exchanger includes a mounting flange separating the heat exchanger into a first side and a second side. A manifold section is on the first side, and includes an inlet manifold and an outlet manifold. A heat exchange section is on the second side, and extends from the mounting flange in a lengthwise direction. A sealing perimeter is on the second side, and the heat exchange section is entirely contained within a projection of the sealing perimeter in the lengthwise direction.

In some embodiments, the heat exchange section includes multiple fluid conduits. Inlet ends of the fluid conduits connect to the inlet manifold, and outlet ends of the fluid conduits connect to the outlet manifold. In some embodiments the heat exchanger includes a header located on the second side to receive the inlet and outlet ends of the conduits. In some such embodiments the sealing perimeter is on an exterior surface of the heat exchanger, and in some embodiments the sealing perimeter defines a circular profile. In some embodiments the sealing perimeter is provided by an o-ring in a circumferential groove.

In some embodiments, the length of the sealing perimeter is substantially equal to the length of the heat exchange section.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
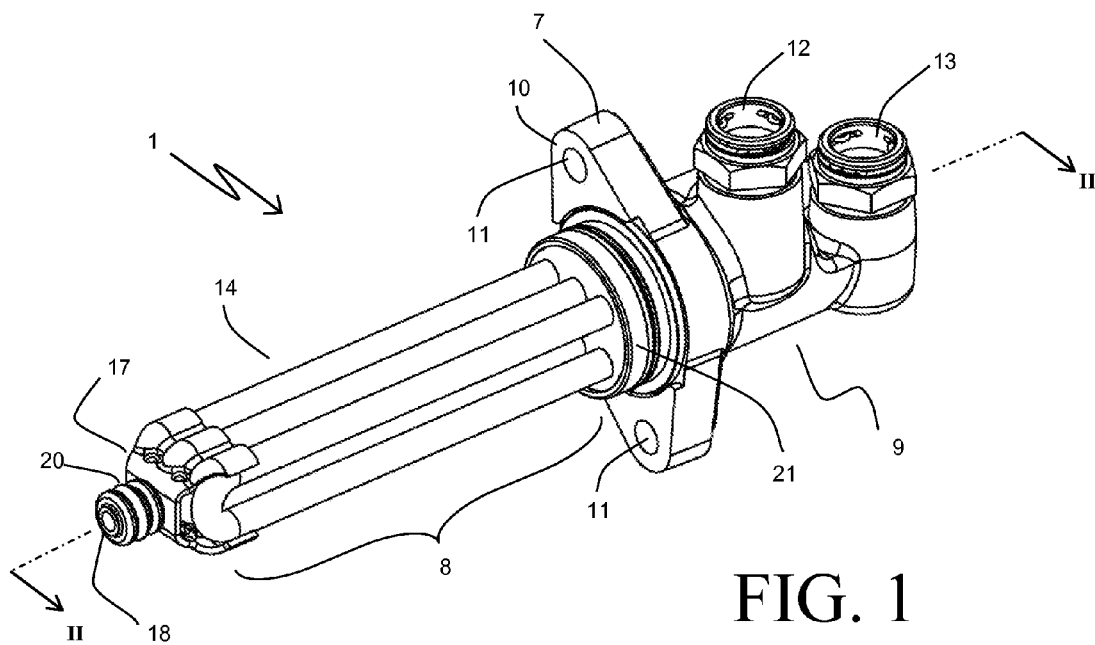
FIG. 1 is a perspective view of a heat exchanger according to an embodiment of the invention.
Figure 2:
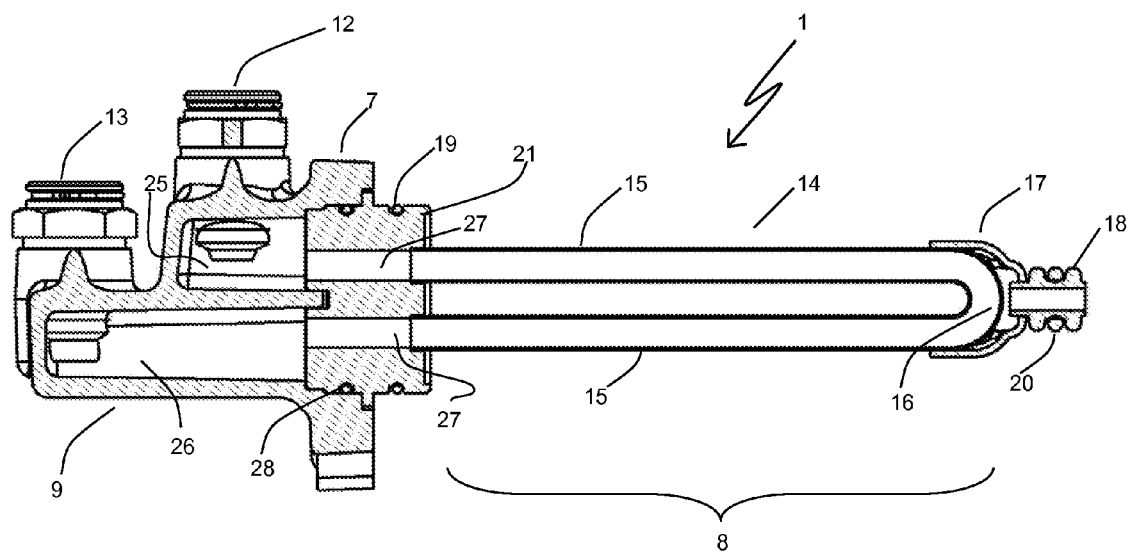
FIG. 2. is a cross-sectional view of the heat exchanger of FIG. 1, along the lines II-II.

FIGS. 1 and 2 illustrate a heat exchanger 1 specifically adapted for installation into the casing of a differential or PTU for an automobile, truck, or other wheeled vehicle. While the heat exchanger 1 is especially well-suited for use as a differential or PTU oil cooler, it should be understood that it can be similarly used to cool oil within a transmission housing, a crank-case, or other similar devices. In addition, the heat exchanger 1 can also find utility as an oil heater by following the same operating principle when the oil housed in the gear casing is at an undesirable low temperature, as might occur during start-up of the vehicle in cold ambient conditions.

The heat exchanger 1 includes a mounting flange 7 separating a heat exchange section 8 and a manifold section 9. Coolant ports 12 and 13 are provided in the manifold section 9, and allow for the connection of the heat exchanger 1 within a coolant loop of the vehicle. A coolant supply line can be coupled to one of the ports 12, 13 in order to supply a flow of coolant to an inlet manifold contained within the manifold section 9. Similarly, a coolant return line can be coupled to the other one of the ports 12, 13 to receive the flow of coolant from an outlet manifold contained within the manifold section 9. As best seen in FIG. 2, the manifold section 9 includes a manifold 25 in direct communication with the port 12, so that the manifold 25 serves as the inlet manifold when the port 12 is coupled to the coolant supply line, and serves as the outlet manifold when the port 12 is coupled to the coolant return line. The manifold section 9 additionally includes a manifold 26 in direct communication with the port 13, so that the manifold 26 serves as the inlet manifold when the port 13 is coupled to the coolant supply line, and serves as the outlet manifold when the port 13 is coupled to the coolant return line.

In some preferable embodiments the mounting flange 7 and the manifold section 9 can be provided as a single integrated component, as shown in FIG. 2. For example, the mounting flange 7 and manifold section 9 can be a cast aluminum component.

The heat exchange section 8 extends outwardly from the mounting flange 7 in a lengthwise direction opposing the location of the manifold section 9. The heat exchange section 8 includes a plurality of fluid conduits defined by formed tubes 14, each of which includes first and second straight lengths 15 joined by a return bend 16 at the end furthest from the mounting flange 7. One of the first and second straight lengths 15 of each tube 14 is fluidly connected to the aforementioned inlet manifold, while the other of the first and second straight lengths 15 of each tube 14 is fluidly connected to the aforementioned outlet manifold, so that a continuous coolant flow path is provided between the port 12 and the port 13 through the tubes 14. While the illustrated embodiment depicts three of the tubes 14, it should be understood that the number of tubes 14 can vary by application, and can number three, more than three, or less than three in certain embodiments.

A bracket 17 is provided at the end of the heat exchange section 8 located furthest from the mounting flange 7. The bracket 17 includes a series of arcuately formed profiles corresponding to the plurality of tube lengths 15, and is joined thereby to the tubes 14 in order to maintain the relative spacing between the tubes 14 at that end of the heat exchange section 8. A locator post 18 is connected to the bracket and extends away from the tubes 14. An o-ring 20 is retained within a groove of the locator post 18.

The tubes 14 are joined to the mounting flange 7 by way of a header 21. The header 21 is of a circular cross-section, and includes a plurality of holes 27 sized and spaced to receive the ends of the straight tube sections 15. A sealing o-ring 19 is provided in a circumferential groove at the outer periphery of the header 21.

In some especially preferable embodiments, the tubes 14, the bracket 17, the support post 18, and the header 21 are all constructed of aluminum, and are joined together in a furnace brazing operation. The header 21 can be joined to the mounting flange 7 by a mechanical press-fit, or with fasteners, or by welding, brazing, or other known joining technologies. Optionally, an additional o-ring 28 can be used in the joining of the header 21 to the mounting flange 7 in order to prevent leakage of coolant from either of the manifolds 25, 26 in the manifold section 9.

Figure 3:
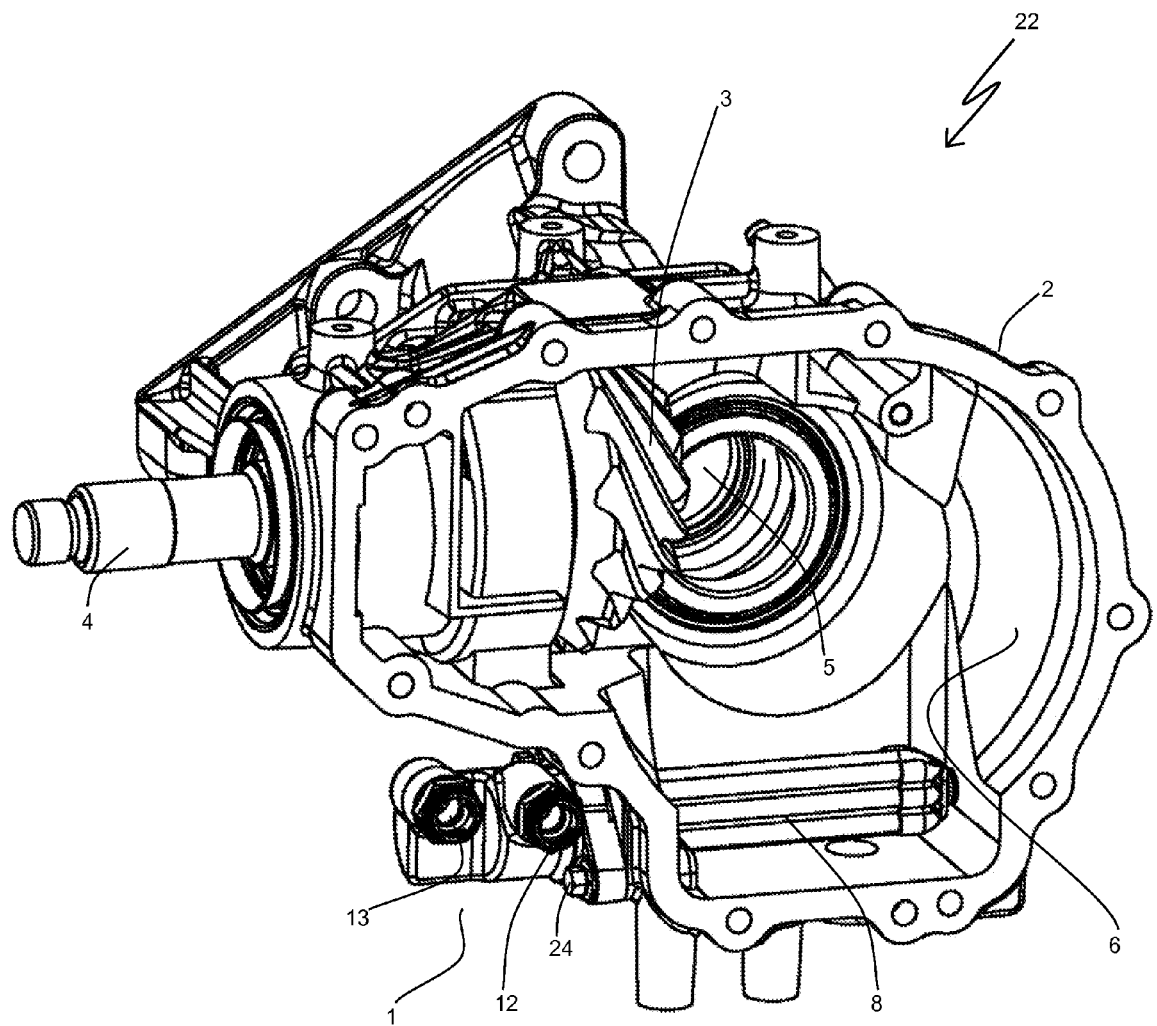
FIG. 3. is a perspective view of the heat exchanger of FIG. 1 installed into a gear casing.
Figure 4:
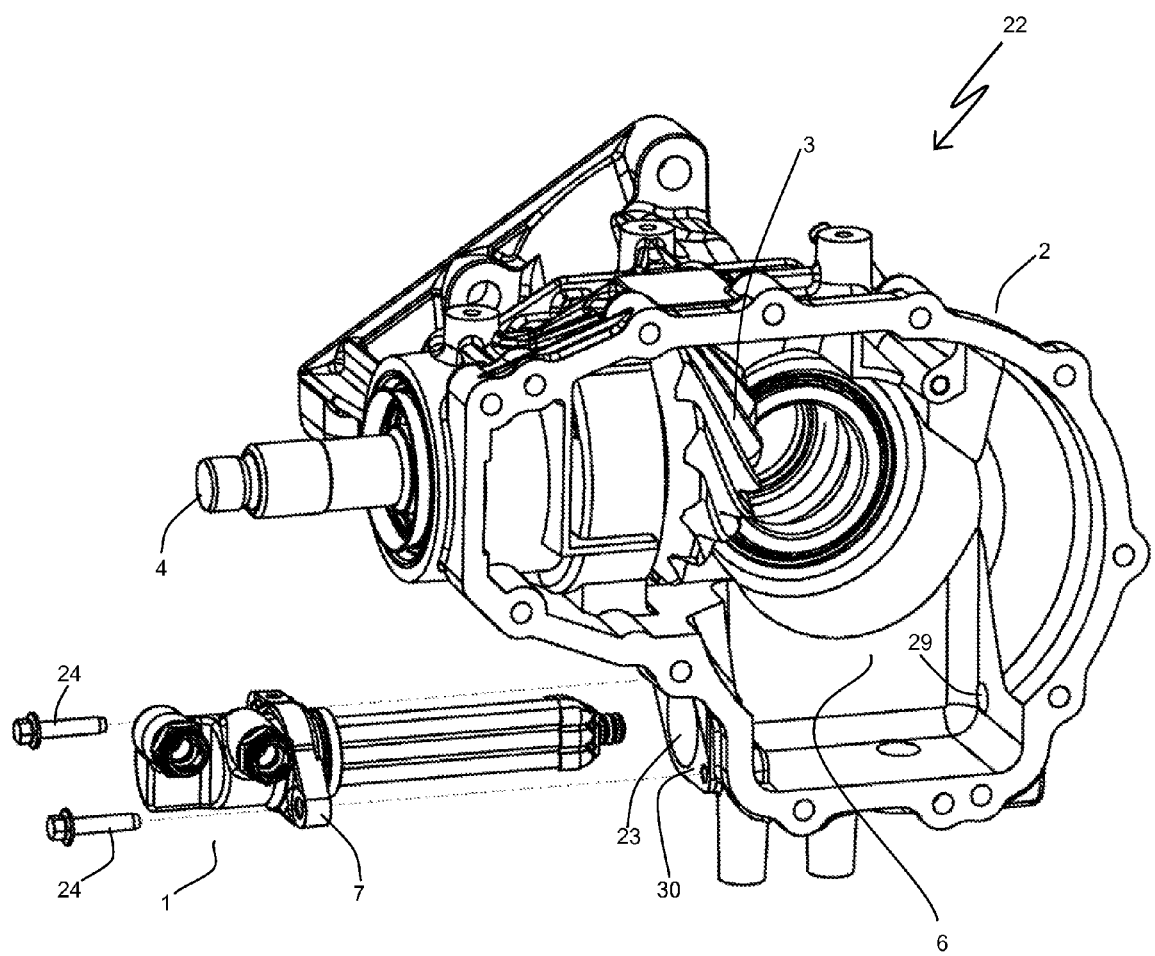
FIG. 4 is a partially exploded version of FIG. 3.

Turning now to FIGS. 3 and 4, it can be seen that the heat exchanger 1 is inserted into a casing 2 of a gear assembly 22, so that the heat exchange section 8 is contained within the internal volume 6 of the casing 2. For purposes of clarity, only half of the casing 2 is shown, and many of the gears and other components within the gear assembly 22 have been omitted.

An aperture 23 is provided in the casing 2 and is sized to receive the heat exchange section 8 of the heat exchanger 1, so that the heat exchanger 1 can be partially inserted through the casing 2 into the internal volume 6 of the gear assembly 22. In the exemplary embodiment the aperture 23 is circular in shape, and of a slightly larger diameter than the header 21 of the heat exchanger 1. Upon insertion of the heat exchanger 1 into the casing 2, the header 21 functions as a plug to fill the aperture 23, with the o-ring 19 being sufficiently deformed by the close fit between the header 21 and the aperture 23 to provide a fluid seal preventing egress of the oil from the casing 2.

The heat exchanger 1 is inserted into the aperture 23 such that the face 10 of the mounting flange 7 is seated against a corresponding flat surface 30 of the casing 2. Threaded fasteners 24 are inserted through the holes 11 in the mounting flange 7 and fastened into corresponding threaded holes in the casing 2 in order to securely retain the heat exchanger 1 in the casing 2. A recess 29 is provided in the casing wall directly opposite the aperture 23, and is sized to receive the locating post 18, with the o-ring 20 engaging against the walls of the recess 29 in order to provide structural support to the end of the heat exchanger 1.

Coolant lines (not shown) can be connected to the ports 12 and 13 in order to plumb the installed heat exchanger 1 into a coolant circuit of the vehicle. The arrangement of the ports 12, 13 on an opposing side of the mounting flange 7 from the heat exchange section 8 allows for simple connection of the heat exchanger 1 to the coolant circuit without requiring the coolant lines to penetrate the casing 2.

In some embodiments, the gear assembly 22 is used as a vehicular differential gear assembly that operates by transmitting a torque imposed on a shaft 4 to a pair of driving wheels of the vehicle. The pinion gear 3 is fixedly coupled to the shaft 4 and rotates along with the shaft. A ring gear (not shown) is oriented perpendicular to the pinion gear and is engaged therewith to rotate in response to the rotation of the shaft 4. The driving torque is transmitted, through rotating gears, to axle shaft gears arranged at the ends of opposing wheel axles (not shown), one of which extends through the circular hole 5 to a first drive wheel, the other of which extends through a similar hole located opposite the hole 5 in the casing to a second drive wheel.

In other embodiments, the gear assembly 22 is used as a vehicular power transfer unit gear assembly that operates by transferring a torque imposed on a shaft (not shown) extending through the circular hole 5 of the casing 2. This shaft is driven by the transmission of the vehicle containing the gear assembly 22, and is oriented to be parallel to the wheel axles. The power transfer unit gear assembly 22 is typically located towards the front of the vehicle in order to be close to the engine and transmission. A bevel gear (not shown) is fixedly coupled to, and rotates with, the shaft, and engages the spur gear 3 in order to impart a torque to the shaft 4. A drive shaft (not shown) is coupled directly to the shaft 4 and extends to a rear axle of the vehicle in order to transmit a driving torque to that rear axle.

As the ring gear or bevel gear rotates through the casing 2, lubricating oil contained within the casing 2 is carried and dispersed through the internal volume 6. As the oil contacts, and flows over, the outer surfaces of the tubes 14, the heated oil is cooled by coolant flowing through the tubes 14. By providing a plurality of spaced apart lengths 15, a large amount of surface area for heat transfer is made available.

As can be readily inferred from FIGS. 1-3, the heat exchange section 8 of the heat exchanger 1 is entirely contained within a volume bounded by a projection of the outer perimeter of the o-ring 19 (i.e. the sealed perimeter) in the lengthwise direction of the tubes 14 (the direction that is perpendicular to the face 10). Thus, a relatively large amount of heat transfer surface area can be provided within the gear assembly 22 through a relatively small aperture 23. In the exemplary embodiment, the outer diameter of the o-ring 19 is 34 mm, resulting in a sealed perimeter of approximately 107 mm. The length of the heat exchange section 8 is of a substantially similar dimension, approximately 100 mm. This is in contradistinction to the aforementioned flat plate integrated gear casing heat exchangers, which require a sealed perimeter that is many times greater than the depth of penetration of the heat exchange section into the internal volume.

The embodiment of the heat exchanger 1 is especially useful when the installation of a differential or PTU cooler is desired after the vehicle is manufactured. As only a small aperture 23 is required for insertion of the heat exchanger 1, the need to remove or substantially disassemble the gear assembly 22 is avoided. The casing 2 can, in some embodiments, be provided with the aperture 23 and the recess 29, with a removable plug provided in the aperture 23. Upon installation of the heat exchanger 1, the plug can be removed and discarded.

Figure 5:
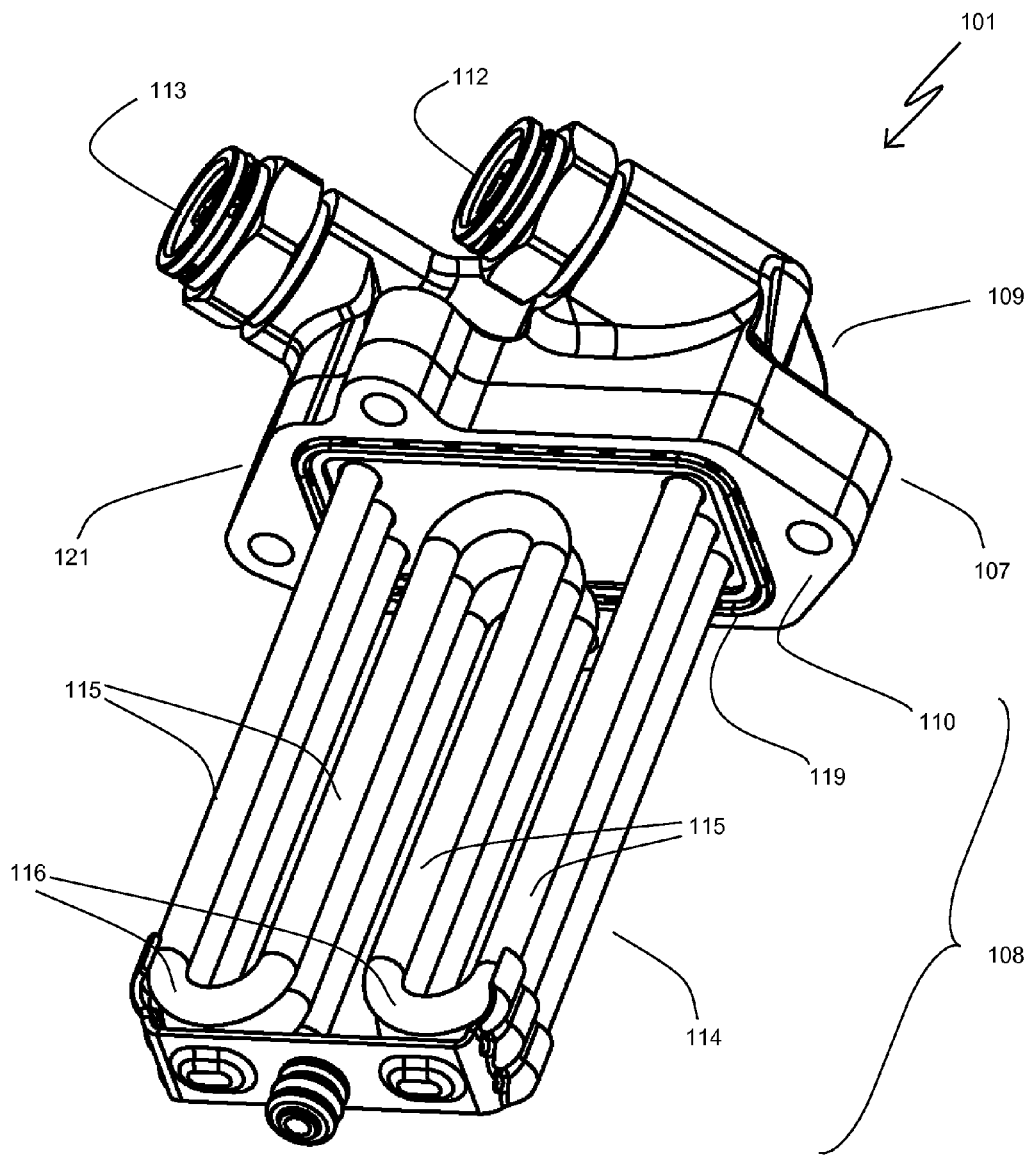
FIG. 5 is a perspective view of an oil cooler according to another embodiment of the invention.

An alternative embodiment of the invention is shown in FIG. 5. Where possible, elements of FIG. 5 have been incremented by 100 compared to similar elements in FIGS. 1 and 2. The heat exchanger 101 is fluidly plumbed into a coolant circuit by way of ports 112 and 113, so that one of the ports serves as a coolant inlet port, and the other serves as a coolant outlet port. In similar fashion to the heat exchanger 1, the heat exchanger 101 includes a mounting flange 107 arranged between a manifold section 109 (containing an inlet manifold and an outlet manifold for the coolant, each of which is connected to one of the ports 112, 113) and a heat exchange section 108.

The heat exchanger 101 employs a plurality of tubes 114 in the heat transfer section 108, the tubes 114 being similar in cross-section to the tubes 14 of heat exchanger 1. However, in the exemplary embodiment of FIG. 5, each of the tubes 114 includes four straight lengths 115, each successive pairs of straight lengths 115 being joined by return bend sections 116.

The heat exchanger 101 further differs from the heat exchanger 1 in that a face seal 119 is employed on the planar surface 110 of the header 121 in the place of the circular o-ring 19. Such a face seal can be preferable in certain instances, such as when the shape of the heat exchange section 108 includes an aspect ratio that deviates significantly from square, and is thus not optimized for insertion through a circular aperture.

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

We claim:

1. A cooled gear assembly including a plurality of engaged gears located within a gear casing having an aperture extending through an outer wall of the casing, and a heat exchanger extending partially into an interior volume of the gear casing through the aperture, the heat exchanger comprising:

a heat exchange section located within the interior volume of the gear casing and including a plurality of fluid conduits;

a manifold section located external to the gear casing and including an inlet manifold and an outlet manifold;

a header to fluidly seal the aperture, inlet ends of the fluid conduits being fluidly connected to the inlet manifold, and outlet ends of the fluid conduits being fluidly connected to the outlet manifold, through the header;

a bracket arranged at an end of the heat exchange section opposite the header;

a locator post connected to the bracket; and a recess in the gear casing to receive the locator post.

2. The cooled gear assembly of claim 1, each one of the plurality of fluid conduits comprising:

a first straight tube length extending from the header and having a tube end joined to the header;

a second straight tube length parallel to the first straight tube length; and a return bend joining those ends of the first and second straight tube lengths furthest away from the header.

3. The cooled gear assembly of claim 2, wherein the bracket comprises at least one pair of profiles, each pair of profiles including a first profile corresponding to a portion of one of the first straight tube lengths and a second profile corresponding to a portion of one of the second straight tube lengths.

4. The cooled gear assembly of claim 3, wherein the at least one pair of profiles is a plurality of pairs of profiles in one-to-one correspondence with the plurality of fluid conduits.

5. The cooled gear assembly of claim 3, wherein the profiles of the at least one pair of profiles each have an arcuate shape and are configured to face in opposite directions of each other.

6. The cooled gear assembly of claim 3, wherein multiple return bends are linearly disposed between each profile in the at least one pair of profiles.

7. The cooled gear assembly of claim 3, wherein the at least one pair of profiles includes multiple pairs of profiles that accumulate in a direction parallel to the direction in which the plurality of fluid conduits accumulates.

8. The cooled gear assembly of claim 1, wherein the post includes a resilient member.

9. A gear casing heat exchanger configured for use with a gear casing, the gear casing heat exchanger comprising:

a mounting flange separating the heat exchanger into a first side, and a second side opposite the first side from the mounting flange;

a manifold section arranged on the first side of the heat exchanger, the manifold section including an inlet manifold and an outlet manifold;

a heat exchange section arranged on the second side of the heat exchanger, the heat exchange section extending from the mounting flange in a lengthwise direction of the heat exchanger section;

a header that couples the heat exchange section and the mounting flange;

a seal located on the second side of the heat exchanger, the seal defining a sealing perimeter where the seal is configured to seal between the gear casing and at least one of the header and the mounting flange, wherein a projection of the sealing perimeter extends perpendicular to the mounting flange in the lengthwise direction of the heat exchange section, and wherein the heat exchange section is entirely contained within the projection of the sealing perimeter.

10. The gear casing heat exchanger of claim 9, wherein the heat exchange section comprises a plurality of fluid conduits, inlet ends of the fluid conduits being fluidly connected to the inlet manifold and outlet ends of the fluid conduits being fluidly connected to the outlet manifold.

11. The gear casing heat exchanger of claim 10, wherein the header receives the inlet and outlet ends of the fluid conduits.

12. The gear casing heat exchanger of claim 10, each one of the plurality of fluid conduits comprising:

a first straight tube length extending from the header and having a tube end joined to the header;

a second straight tube length parallel to the first straight tube length; and a return bend joining those ends of the first and second straight tube lengths furthest away from the header.

13. The gear casing heat exchanger of claim 12, further comprising: a bracket arranged at the end of the heat exchanger section opposite the header, the bracket comprising at least one pair of profiles, each pair of profiles including a first profile corresponding to a portion of one of the first straight tube lengths and a second profile corresponding to a portion of one of the second straight tube lengths.

14. The gear casing heat exchanger of claim 13, wherein the at least one pair of profiles is a plurality of pairs of profiles in one-to-one correspondence with the plurality of fluid conduits.

15. The gear casing heat exchanger of claim 13, wherein the profiles of the at least one pair of profiles each have an arcuate shape and are configured to face in opposite directions of each other.

16. The gear casing heat exchanger of claim 13, wherein multiple return bends are linearly disposed between each profile in the at least one pair of profiles.

17. The gear casing heat exchanger of claim 13, wherein the at least one pair of profiles includes multiple pairs of profiles that accumulate in a direction parallel to the direction in which the plurality of fluid conduits accumulates.

18. The gear casing heat exchanger of claim 9, further comprising:

a bracket arranged at the end of the heat exchange section opposite the header; and a locator post connected to the bracket.

19. The gear casing heat exchanger of claim 18, wherein the post includes a resilient member.

* * * * *